Figure 1:
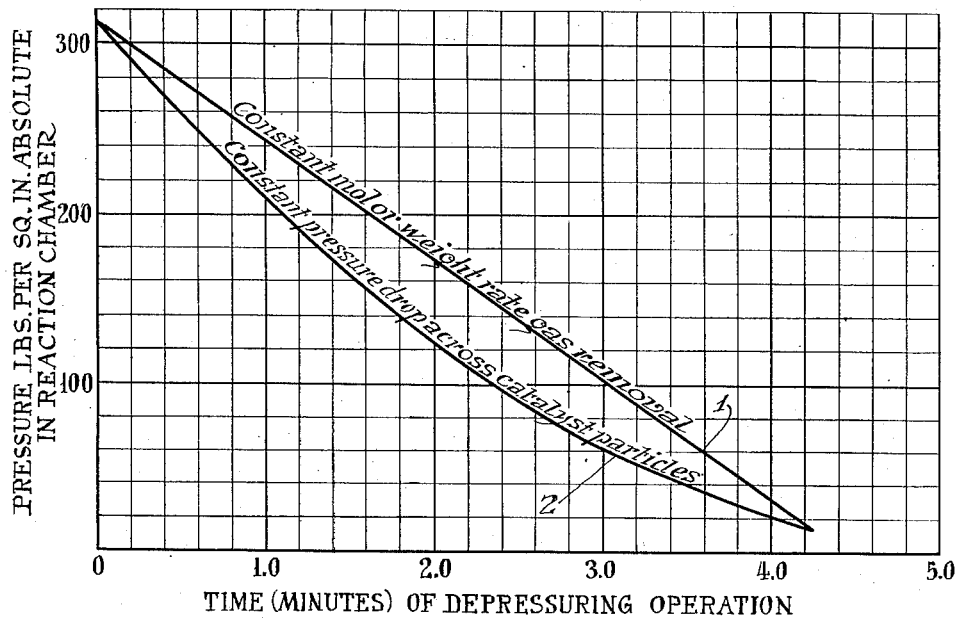

April 3, 1945.     I. MAYER     2,373,043

METHOD OF DEPRESSURING CATALYST-CONTAINING CHAMBERS

Filed June 25, 1942

Inventor:
Ivan Mayer
By Donald E. Payne
Attorney

UNITED STATES PATENT OFFICE 2,373,043

METHOD OF DEPRESSURING CATALYST-CONTAINING CHAMBERS

Ivan Mayer, Galveston, Tex., assignor to Pan American Refining Corporation, New York, N. Y., a corporation of Delaware Application June 25, 1942, Serial No. 448,337

4 Claims. (Cl. 23—1)

This invention relates to catalytic conversion systems wherein a bed of solid porous catalyst particles is operated at high pressures during an on-stream period or a regeneration period and wherein catalyst-containing chambers are periodically depressured to facilitate purging, regeneration or on-stream reactions. Thus the invention is applicable to a catalytic cracking system wherein a bed of porous solid cracking catalyst is regenerated at a pressure of 100 pounds or more per square inch and is then depressured to a much lower pressure. The invention is also applicable to high pressure hydrogenation, polymerization, reforming and other hydrocarbon conversion systems and it is particularly applicable to the so-called hydroforming or dehydroaromatization system for converting paraffinic heavy naphthas into high octane number motor fuels containing substantial amounts of aromatics and preferably characterized by a substantial toluene content. The invention will be described as applied to this so-called hydroforming or dehydroaromatization process but it should be understood that the invention is also applicable to other processes wherein depressuring of a catalyst containing chamber is one step in the cycle of operations.

The invention is particularly applicable to the depressuring of porous solid catalysts or catalyst material in relatively large beds. Thus for a 7,500 barrel per day plant for hydroforming or aromatizing a heavy naphtha, catalyst chambers may be about 15 feet in diameter by about 16 feet deep and the volume of the catalyst bed in this reactor may be about 2,000 to 2,800 cubic feet. During regeneration about 2,000,000 to 3,000,000 cubic feet per hour of flue gas may be recirculated through this bed and air may be introduced into the recirculating stream at the rate of 120,000 to 200,000 cubic feet per hour. In such a system it is essential to maintain a relatively low pressure drop across the bed. An object of my invention is to provide an improved method of avoiding unduly high pressure drops through such a system in which the catalyst is periodically passed through a cycle of steps including a depressuring step.

If the pressure on the catalyst in the reaction chamber is suddenly released there is a tendency for the entrained gases and catalyst particles to explode (like puffed wheat or popcorn). This causes a shattering and disintegration of catalyst particles which not only impairs catalyst activity but tends to cause a plugging of the catalyst bed and an increase in pressure drop across the bed.

An object of my invention is to minimize this type of catalyst degradation.

The sudden changing of a valve from closed to open position is objectionable because if the valve opening is of large cross-sectional area the pressure drop will be too rapid and will cause the undesired disintegration of catalyst while if the valve is small, in cross-sectional area, the time required for depressuring will be unduly prolonged, thus materially decreasing the capacity of the unit by reducing the time of its on-stream period. An object of my invention is to effect a rapid depressuring of a catalyst-containing chamber without deleteriously effecting the catalyst particles. A further object is to provide a pressure-time relationship in a depressuring operation which will maintain a substantially constant pressure difference between the center of the catalyst particles or pellets and the outer surfaces of said particles or pellets.

To avoid catalyst disintegration it has been proposed to provide a cam operated valve which will permit the release of gases or vapors from the chamber at a substantially constant mol or weight rate. In actual operation this method has apparently not solved the problem. Microscopic examination of catalyst samples removed from a bed periodically depressured in this manner has indicated that the surface porosity of the catalyst pellets has increased with catalyst age and one of the major operating difficulties encountered in such operations is the rapid rate of deterioration of catalyst resulting in excessive pressure drop through catalyst beds. Depressuring at a constant rate, i. e., a constant mol or weight rate, results in a pressure difference between the center and surface of each catalyst particle or pellet which increases as the pressure is reduced on the reactor. The rate of increase in the pressure differential is extremely high during the last part of depressuring. An object of my invention is to maintain a substantially constant pressure difference between the center and surface of each catalyst particle or pellet during the depressuring step and to thereby prevent the spalling of the catalyst pellets which ultimately results in high overall pressure drops through the catalyst beds.

With depressuring at a substantially constant rate, i. e., rejecting gas from the reactors at a constant weight rate, the relationship of the pressure in the chamber to time may be expressed by the following formula:

$$P = k_1 t + c_1$$

where P is absolute pressure, $k_1$ and $c_1$ are constants and $t$ is time expressed for example in minutes. In practicing my invention I employ a pressure time relationship substantially in accordance with the following formula:

$$\sqrt{P}=kt+c$$

In other words, instead of making time proportional to pressure I make time proportional to the square root of pressure and I thus maintain a substantially constant pressure differential between the center of the catalyst particles or pellets and the outer surfaces thereof.

The invention will be more clearly understood by reference to the accompanying drawing wherein The single figure is a chart showing a comparison of my depressuring curve with the gradual pressure release curve.

The catalyst in this specific example is an active alumina with about 6% of molybdenum oxide deposited thereon. The invention is not limited, however, to this particular catalyst but is applicable to any porous solid catalyst particles or pellets. For hydroforming such catalyst is preferably an active alumina or alumina gel with a small amount of a group VI metal oxide deposited thereon or incorporated therewith. For catalytic cracking the catalyst may be a silica gel with a small amount of alumina, magnesia or other metal oxide deposited thereon or incorporated therewith. Also, for catalytic cracking or other conversion processes, the catalyst may be an acid treated montmorillonite clay such as Super Filtrol in molded or pelleted form. For polymerization the catalyst may be phosphoric acid deposited on kieselguhr or other porous solid support.

In the hydroforming or dehydroaromatization process a paraffinic naphtha vapor may be passed through the catalyst bed at a temperature of about 900 to 1050° F., at a gauge pressure of about 300 pounds per square inch and at a space velocity of about ½ to 1 volume of liquid stock per hour per volume of catalyst space. About 2,500 cubic feet of hydrogen-rich recycle gas may be passed through the contacting chamber per barrel of stock charged thereto. For a 7,500 barrel per day plant the catalyst chamber may contain about 45 tons of catalyst. The pressure drop through the catalyst bed should be of the order of about 1 or 2 pounds per square inch.

The on-stream period may be about 6 hours. After the on-stream period a valve is slowly opened in order that the reaction chamber may be depressured for purging. It was previously known that a sudden release from pressure would be deleterious to the catalyst but it is desirable that the time of depressuring be maintained within the approximate range of 4 to 6 minutes in order that the catalyst may be regenerated and put back on-stream without loss of valuable time and loss of valuable heat. Heretofore this depressuring step has been effected by a gradual reduction of pressure following the line 1 of the figure. This depressuring has been effected by a cam operated valve, the rate of valve opening being controlled by the shaft of the cam. In practicing my invention it is simply necessary to change the shape of the cam so that the pressure drop in the reactor will be along line 2 of the figure. The design and construction of the valves and cams are, of course, well known in the art and since any one skilled in the art can readily design a cam to effect pressure reduction along line 2 of the figure, substantially in accordance with the formula $\sqrt{P}=kt+c$, the precise valve structure and cam shape will not require detailed description.

With gradual depressuring from 300 pound gauge to atmospheric pressure in about 4 minutes, the pressure at the end of the first minute will be about 245 pounds per square inch while in accordance with my procedure it will be about 210 pounds. At the end of 2 minutes with gradual pressure drop, the pressure will be about 155 pounds while in accordance with my invention it would be only about 125 pounds. At the end of 3 minutes with gradual depressuring the pressure would be about 100 pounds while in accordance with my invention it will only be about 60 pounds. At the end of 4 minutes with gradual depressuring the pressure would be about 32 pounds while in accordance with my invention it would only be about 22 pounds, all of the above pressures being in pounds per square inch absolute.

After the depressuring step the catalyst may be purged and then repressured for regeneration. After the regeneration step which may be at a pressure of 100 to 400 pounds per square inch the catalyst may again be repressured for purging prior to being repressured for on-stream conversion. My invention is applicable to each and all of these depressuring steps.

In the specific example hereinabove described where the initial pressure is 315 pounds per square inch absolute, the equation representing the time-pressure relationship in the reaction chamber is substantially:

$$\sqrt{P}=-3.3t+17.7$$

where P is the pressure in the chamber and $t$ is time in minutes. In this case the value of $k$ is approximately $-3.3$ and the value of $c$ is approximately 17.7. The value of $c$ in the general formula will be the square root of the initial reactor pressure before depressuring is commenced and the value of $k$ determines the rate of depressuring. For most cases I prefer that the value of $k$ be between about $-1$ and $-5$ although in some instances it may be up to $-10$ or more.

The application of my depressuring method is particularly important toward the end of the depressuring step where large volumes of gas must be removed per unit change in pressure. In some cases it may only be essential to employ my depressuring method at the end of the depressuring step since relatively sharp pressure drops in the catalyst chamber at high pressure levels have much less effect on the pressure drop across the catalyst particles themselves than do sharp pressure drops in the catalyst chamber at relatively low pressures.

In practicing my invention it is not necessary, of course, to follow the exact formula:

$$\sqrt{P}=kt+c$$

but it is essential that such line be approximated. In other words, the rate of pressure drop should more nearly approach the curve defined by the equation:

$$\sqrt{P}=kt+c$$

than it approaches the curve:

$$P=k_1t+c_1$$

While I have described in detail a preferred embodiment of my invention it should be understood that the invention is not limited to the specific example hereinabove set forth or to the depressuring of specific catalysts hereinabove mentioned since the application of the invention to other catalysts and the use of other conditions will be apparent from the above detailed description to those skilled in the art.

I claim:

1. In a catalytic conversion system wherein a large bed of porous solid catalyst particles are retained in a conversion chamber and wherein said chamber is depressured from a high pressure to a low pressure between on-stream periods, the method of preventing catalyst degradation which comprises maintaining a time-pressure relationship during the depressuring step to approximate that defined by the following formula:

$$\sqrt{P} = kt + c$$

where $P$ is the absolute pressure in pounds per square inch in the chamber, $t$ is time in minutes and $k$ and $c$ are constants, the constant $k$ being at a fixed value throughout the depressuring operation and being within the approximate range of $-1$ to $-10$, and the constant $c$ being the square root of the high pressure in the conversion chamber before the beginning of the depressuring step.

2. The method of claim 1 wherein $k$ is within the approximate range of $-1$ to $-5$.

3. The method of claim 1 wherein $k$ is approximately $-3.3$.

4. The method of depressuring a reforming catalyst consisting essentially of molybdenum oxide mounted on alumina from a gauge pressure of about 300 pounds per square inch to about atmospheric pressure in approximately 4 minutes without obtaining spalling and degradation of the catalyst which method comprises depressuring said chamber at least toward the end of the depressuring step substantially in accordance with the following time-pressure relationship:

$$\sqrt{P} = -3.3t + 17.7$$

where $P$ is pressure in pounds per square inch absolute and $t$ is time in minutes.

IVAN MAYER.